United States Patent
Lamkhede et al.

(10) Patent No.: US 9,619,558 B2
(45) Date of Patent: Apr. 11, 2017

(54) METHOD AND SYSTEM FOR ENTITY RECOGNITION IN A QUERY

(71) Applicant: Yahoo! Inc., Sunnyvale, CA (US)

(72) Inventors: Sudarshan Lamkhede, Santa Clara, CA (US); Peter Mika, Barcelona (ES); Vinod Balakrishnan, Fremont, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 201 days.

(21) Appl. No.: 14/264,112

(22) Filed: Apr. 29, 2014

(65) Prior Publication Data

US 2015/0310016 A1     Oct. 29, 2015

(51) Int. Cl.
*G06F 17/30* (2006.01)

(52) U.S. Cl.
CPC ............... *G06F 17/30737* (2013.01)

(58) Field of Classification Search
None
See application file for complete search history.

(56) References Cited

U.S. PATENT DOCUMENTS

2012/0130978 A1* 5/2012 Li ............... G06F 17/3064
                                                707/706

OTHER PUBLICATIONS

Pasca, Marius, "Weakly-Supervised Discovery of Named Entities Using Web Search Queries," Nov. 6-8, 2007, CIKM'0, Lisboa, Portugal, pp. 683-690.
Guo, Jiafeng et al., "Named Entity Recognition in Query," Jul. 19-23, 2009, SIGIR'09, Boston, MA, pp. 267-274.
Du, Junwu et al., "Using Search Session Context for Named Entity Recognition in Query," Jul. 19-23, 2010, SIGIR'10, Geneva, Switzerland, pp. 765-766.
Jain, Alpa et al., "Domain-Independent Entity Extraction from Web Search Query Logs," Mar. 28-Apr. 1, 2011, WWW 201, Hyderabad, India, pp. 63-64.

* cited by examiner

*Primary Examiner* — Syed Hasan
(74) *Attorney, Agent, or Firm* — Pillsbury Winthrop Shaw Pittman LLP (57) ABSTRACT

Methods, systems and programming for entity recognition in a query. In one example, an index that associates an alias with one or more entities is obtained. Each of the one or more entities is associated with one or more features. A query associated with one or more features is received from a user. The alias is then identified in the query. At least one of the one or more entities is determined based, at least in part, on the features associated with each of the one or more entities and the features associated with the query.

17 Claims, 12 Drawing Sheets

METHOD AND SYSTEM FOR ENTITY RECOGNITION IN A QUERY

BACKGROUND

1. Technical Field

The present teaching relates to methods, systems, and programming for entity recognition. Particularly, the present teaching is directed to methods, systems, and programming for entity recognition in a query.

2. Discussion of Technical Background

Online content search is a process of interactively searching for and retrieving requested information via a search application running on a local user device, such as a computer or a mobile device, from online databases. Online search is conducted through search engines, which are programs running at a remote server and searching documents for keywords in a search query and return a search result page including a list of the documents where the keywords were found. Some keywords in search queries—aliases that are associated with named entities—are of particular interest in search because they often reflect users' actual search intents behind their search queries and because those search results retrieved based on named entities are usually more relevant to the search query. Thus, great efforts have been made to named entity recognition (NER) in search queries.

Some known solutions rely solely on Wikipedia entities as the basis for identifying named entities in received queries and return only one entity for each query. Other known solutions try to solve which span in a query means what and then look at all possible interpretations of the query and rank them in their likelihood of occurrence in the query, which is inefficient in online search and is difficult to be scaled up to a larger entity base. Efforts have also been made to discover named entities that follow certain query patterns in offline query log mining systems. However, those offline systems are not integrated with runtime online search components. Moreover, most of the known solutions do not take user context and/or user feedback into consideration in their recognitions.

Therefore, there is a need to provide an improved solution for entity recognition in a query to solve the above-mentioned problems.

SUMMARY

The present teaching relates to methods, systems, and programming for entity recognition. Particularly, the present teaching is directed to methods, systems, and programming for entity recognition in a query.

In one example, a method, implemented on at least one computing device each having at least one processor, storage, and a communication platform connected to a network for entity recognition in a query is presented. An index that associates an alias with one or more entities is obtained. Each of the one or more entities is associated with one or more features. A query associated with one or more features is received from a user. The alias is then identified in the query. At least one of the one or more entities is determined based, at least in part, on the features associated with each of the one or more entities and the features associated with the query.

In a different example, a system having at least one processor, storage, and a communication platform for entity recognition in a query is presented. The system includes an indexing module, a tokenizing unit, an identifying unit, and a determining unit. The indexing module is configured to obtain an index that associates an alias with one or more entities. Each of the one or more entities is associated with one or more features. The tokenizing unit is configured to receive a query from a user. The query is associated with one or more features. An identifying unit is configured to identify the alias in the query. The determining unit is configured to determine at least one of the one or more entities based, at least in part, on the features associated with each of the one or more entities and the features associated with the query.

Other concepts relate to software for entity recognition in a query. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for entity recognition in a query is presented. The recorded information, when read by the machine, causes the machine to perform a series of processes. An index that associates an alias with one or more entities is obtained. Each of the one or more entities is associated with one or more features. A query associated with one or more features is received from a user. The alias is then identified in the query. At least one of the one or more entities is determined based, at least in part, on the features associated with each of the one or more entities and the features associated with the query.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and effective entity recognition in a query. Unlike traditional approaches, the method and system as disclosed herein aims to return a set of named entities that can best answer the query, given the context. The method and system is domain neutral, fast, allows personalization, high prevision, and can learn from user feedback. Unlike some known solutions, the method and system at runtime is domain independent. As long as aliases for entities from different domains are obtained, those entities can be retrieved and ranked using the method and system in the present disclosure. The entity recognition achieved by the method and system is also personalize, which considers user information, such as location, past search history, interests, and demographic attributes. In addition, the method and system is context aware, meaning that signals from other backbends as well as entity trends are also considered by the method and system. Moreover, due to the extensive offline tuning and various runtime performance optimizations, the retrieval and ranking of entities by the system and method can happen in less than 20 ms most of the times.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
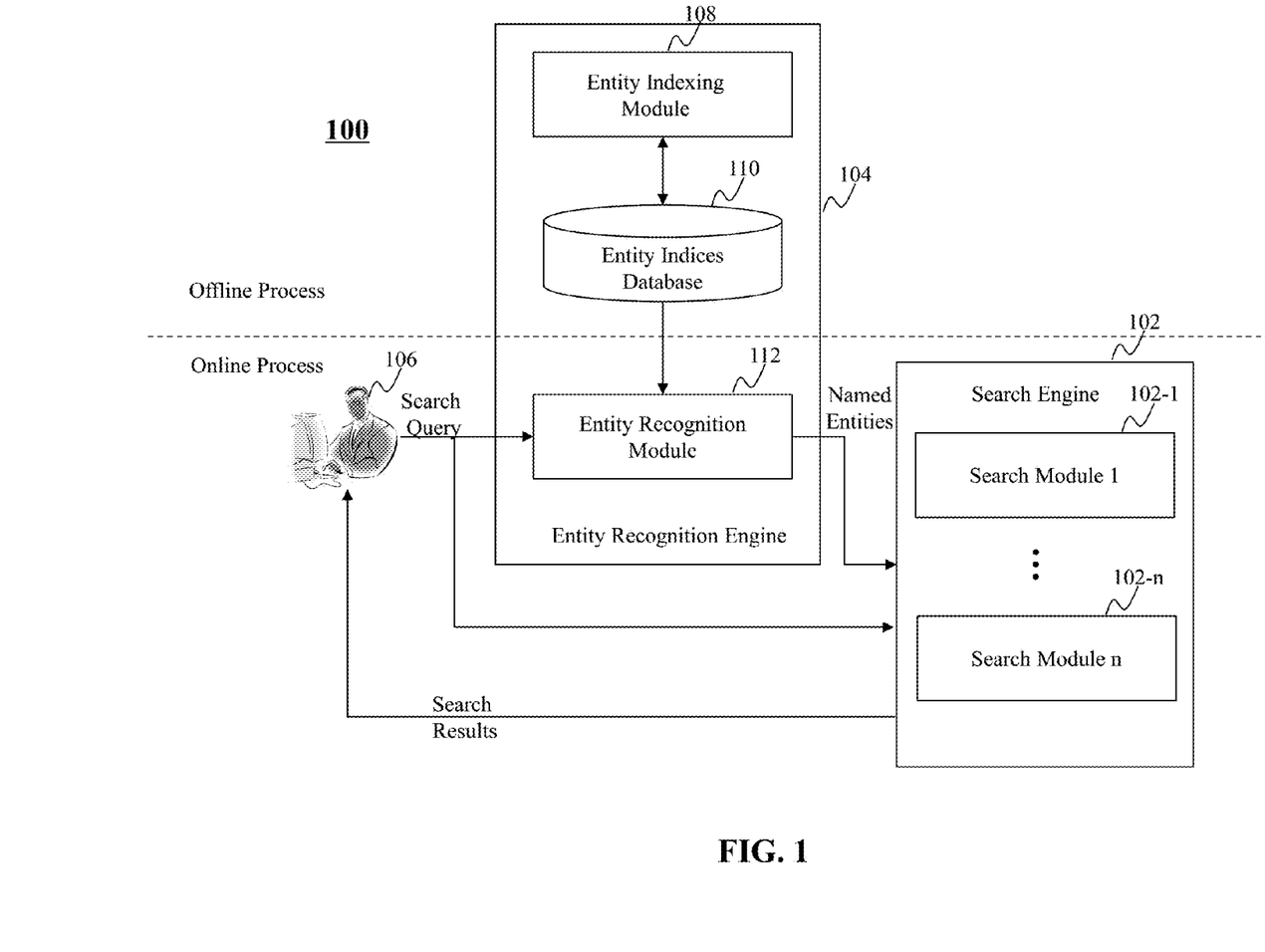
FIG. 1 is a high level exemplary system diagram of a system for search based on entity recognition in a query, according to an embodiment of the present teaching.

FIG. 1 is a high level exemplary system diagram of a system for search based on entity recognition in a query, according to an embodiment of the present teaching. The system 100 in this example includes a search engine 102 and an entity recognition engine 104. A user 106 in this example performs an online search through a search application on a user device using the backend search engine 102. For example, the user 106 inputs a search query to the search engine 102 and the entity recognition engine 104 and receives query results from the search engine 102. The entity recognition engine 104 in this example is configured to recognize entities from the received search query and provide ranked entities to the search engine 102 at the pre-retrieval phase, i.e., before federating the query to all back-end search modules 102-1 . . . 102-n. The "entity" referred in the present disclosure includes named entity, which may be a phrase that identifies one item from a set of other items that have similar attributes, such as proper nouns or common names acting as proper nouns. Examples of named entities include, for example, names of persons, organizations, locations, etc.

The user device (not shown) may be a laptop computer, desktop computer, netbook computer, media center, mobile device (e.g., a smart phone, tablet, music player, and GPS), gaming console, set-top box, printer, or any other suitable device. A search application, such as a web browser or a standalone search application, may be pre-installed on the user device by the vendor of the user device or installed by the user 106. The search application may serve as an interface between the user 106 and the remote search engine 102. The search application may be stored in storage on the user device and loaded into a memory once it is launched by the user 106. The search engine 102 in this example may be any suitable search engine that is responsible for analyzing the received query from the user 106 and entities recognized in the query by the entity recognition engine 104, fetching query results, and providing the query results to the user 106. The search engine 102 in this example may include various vertical search modules 102-1 . . . 102-n, each of which can return search results in a particular domain or a data source. Examples of the search modules 102-1 . . . 102-n include news, local, shopping, maps, images, videos, books, flights, etc. In addition to returning query results to the user 106, the search engine 102 may also provide advertisement related to the query or query results, provide search assistant by query suggestions, and analyze and indicate trends in search using any suitable modules (not shown).

The entity recognition engine 104 in this example includes an entity indexing module 108, an entity indices database 110, and an entity recognition module 112. The entity indexing module 108 may continuously or periodically run offline to build and update the entity indices database 110 such that the entity recognition for each user query can occur in real-time as an online process to reduce the response time. The entity indexing module 108 is configured to obtain indices, each of which associates an alias with one or more entities. Each entity is also associated with one or more features. The indices are then saved and updated in the entity indices database 110. The entity recognition module 112 at runtime retrieves one or more entities from the entity indices database 110 based on aliases found in the query received from the user 106 and refines and ranks the retrieved entities based on the features associated with each entity and/or the features associated with the query. The ranked entities are provided to the search engine 102.

Various applications may be achieved by the search engine 102 based on the entities recognized in the user query. In one embodiment, some search results or advertisement may be retrieved based directly on the top-ranked entity or entities, rather than the keywords in the query. For example, the entity recognition module 112 may recognize that the top-ranked entity in the query "16th US president" is "Abraham Lincoln" and thus, use "Abraham Lincoln," rather than any keywords in the query to retrieve search results. In another embodiment, the ranked entities may be collected by the search suggestion module (not shown) of the search engine 102 to provide instant entity suggestion for input query fragment. In still another embodiment, queries may be mapped by the search engine 102 to the recognized top entities. Sudden increase in query traffic for a particular entity is indicative of a breaking news and development. In yet another embodiment, the search engine 102 may perform fast knowledge searching within a given domain of knowledge based on the top-ranked entities. In the example mentioned before, once "Abraham Lincoln" is recognized as the top entity, the search engine 102 may search directly in the vertical/domain of, for example, history to get a faster search with more focused search results compared with a general search in a general domain based on the keywords of the query "16th US president."

Figure 2:
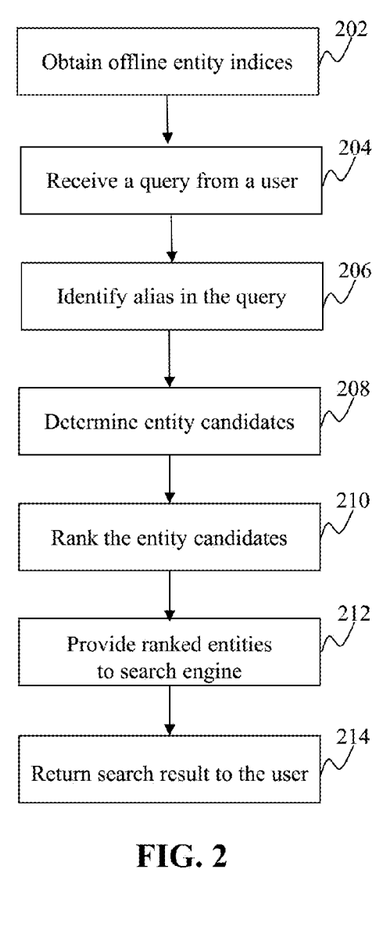
FIG. 2 is a flowchart of an exemplary process for search based on entity recognition in a query, according to an embodiment of the present teaching.

FIG. 2 is a flowchart of an exemplary process for search based on entity recognition in a query, according to an embodiment of the present teaching. Beginning at 202, entity indices are obtained in an offline process. In this example, each index maps between an alias and one or more entities with corresponding measures of strength of association. The "alias" referred in the present disclosure includes a phrase in a query that is associated with at least one entity. In each index, each entity is also associated with one or more features (entity features), such as but not limited to, domain, type, popularity, location, staleness/recency, strength of association between alias and entity, etc. The indices may be built using manual labeling and/or data mining based on data from multiple data sources and domains, such as query logs and knowledge database.

At 204, a query is received from a user. One or more aliases are identified from the query at 206. Each query may be divided into various segments, some of which may be aliases if they are associated with at least one entity according to the offline entity indices. Those phrases that are not associated with any entity are considered as "non-entity keywords" and are disregarded in entity recognition in this example. It is understood that in some cases, no alias is identified from all the possible segments of a query, and the process of entity recognition thus will not proceed in those examples. At 208, based on each identified alias, entity candidates are determined based on the mapping in the entity indices. It is understood that in some queries, multiple aliases may be identified, and each alias may be associated with more than one entity according to the indices. Thus, the total number of entities for those queries may be large. It is also understood that for some queries, only one entity is determined.

If there is more than one entity is determined at 208, these entities are ranked at 210 based on the features associated with each entity (entity features) and/or the features associated with the query (query feature). Query features indicate the context of the query and/or the user who inputs the query and include, for example, features extracted based on information of the user and features extracted based on context of the query. The query features include, for example, user location, user session history, user demographics, user declared and inferred interests, query popularity, query trends, etc. Some entity candidates may be filtered out before the ranking based on their entity features using predefined rules. The details of the filtering and ranking are described later with respect to FIGS. 5-8. At 212, the ranked entities (or the single entity for some queries) are provided to the search engine. At 214, search results are returned to the user. At least some of the search results are retrieved based on the ranked entities provided at 212. In this exemplary process, 204-214 are performed at runtime as an online process when a user query is received, while 202 is performed offline in advance to reduce the runtime response time.

Figure 3:
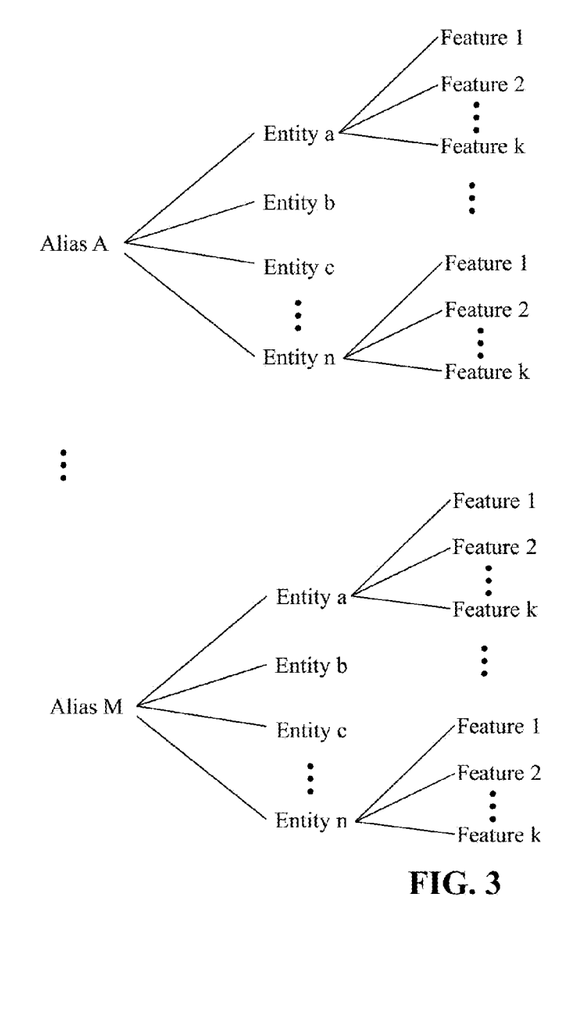
FIG. 3 depicts exemplary indices that associate aliases, entities, and features, according to an embodiment of the present teaching.

FIG. 3 depicts exemplary indices that associate aliases, entities, and features, according to an embodiment of the present teaching. In each index, an alias (A . . . M) is associated with an entity (a, b, c, . . . n). In one example, an alias "007" may be associated with entities such as "James Bond," "Pierce Brosnan," "Skyfall," etc. Each entity is further associated with one or more entity features (1, 2, . . . k). As mentioned before, the entity features may include, for example, domain, type, popularity, locations, staleness/recency, strength of association between alias and entity, etc. In the "007" example, the entity "James Bond" may be associated with domain "movie," type "character," popularity "high," etc.; the entity "Skyfall" may be associate with domain "movie," type "movie name," recency "2012," etc. Although in the "007" example, all the entities are in the same domain "movie," in some embodiments, an alias may be associated with entities across different domains. In other words, the indices may be domain neutral or domain independent. Moreover, it is understood that a particular entity may be associated with multiple aliases (i.e., different aliases may point to the same entity). It is also understood that some aliases may be associated with only one entity.

Figure 4:
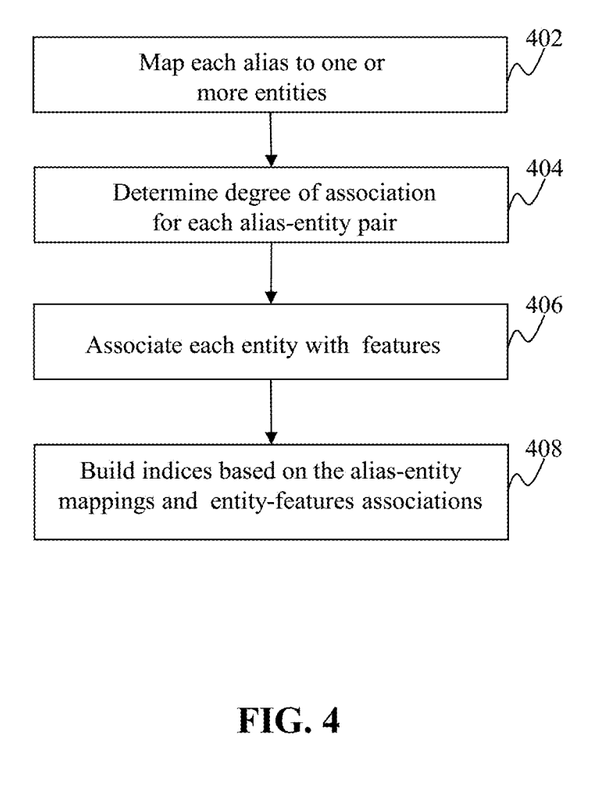
FIG. 4 is a flowchart of an exemplary process for building the indices shown in FIG. 3, according to an embodiment of the present teaching.

FIG. 4 is a flowchart of an exemplary process for building the indices shown in FIG. 3, according to an embodiment of the present teaching. At 402, each alias is mapped to one or more entities. At 404, degree of association for each alias-entity pair is determined. 402 and 404 may consume data from multiple data sources and domains, such as query logs and knowledge database by manual labeling or any suitable data mining approaches. At 406, each entity is associated with entity features. Entity features may be extracted and determined by manual labeling or any suitable data mining approaches for each alias and/or entity. At 408, indices are built based on the alias-entity mappings and the entity-feature associations. In one example, data from multiple data sources and domains are compiled into a Finite State Automata (FSA), which maps aliases to entities (reverse index), and entity features are loaded as a simple hash map (forward index).

Figure 5:
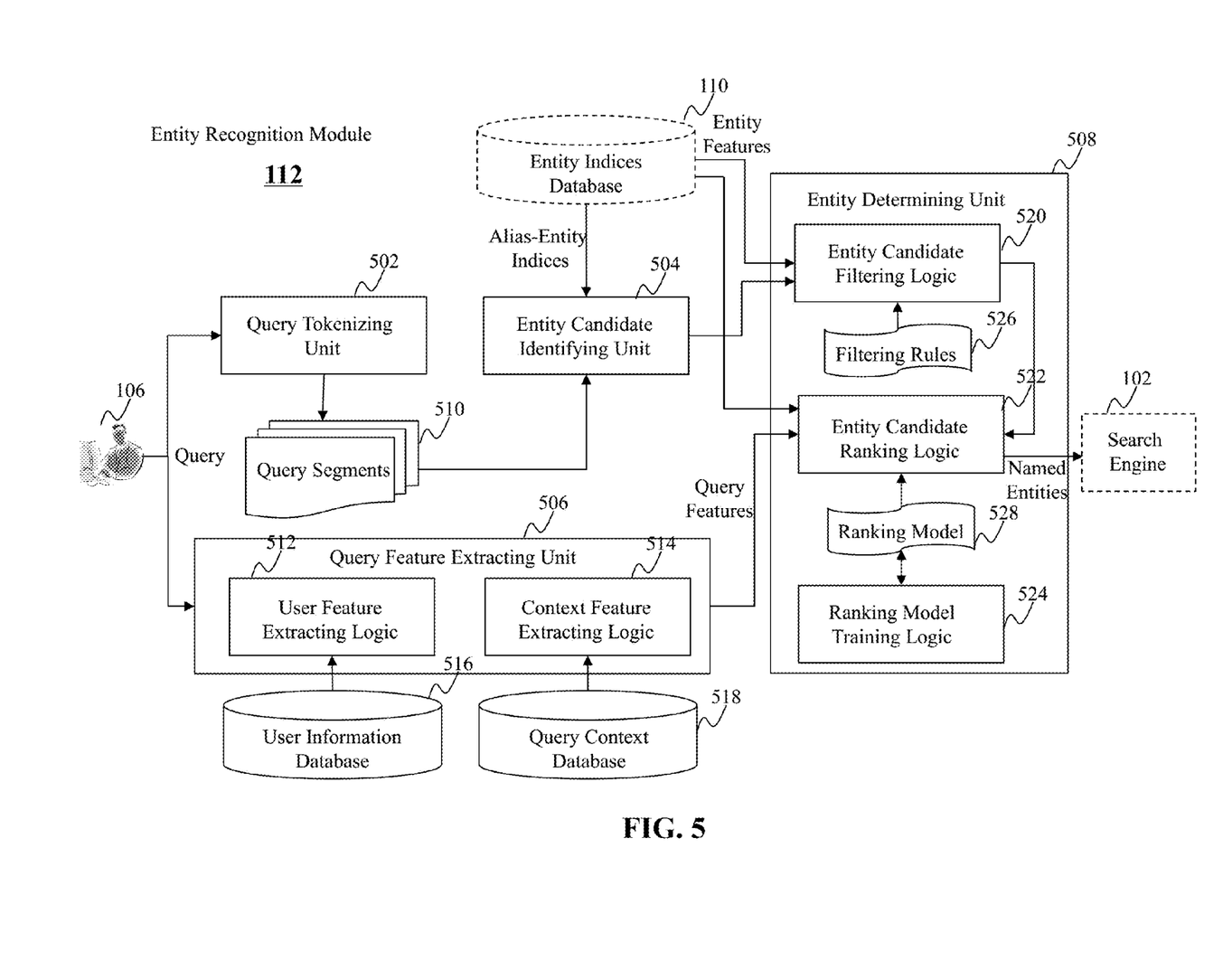
FIG. 5 is an exemplary diagram of an entity recognition module of the system shown in FIG. 1, according to an embodiment of the present teaching.

FIG. 5 is an exemplary diagram of an entity recognition module 112 shown in FIG. 1, according to an embodiment of the present teaching. The entity recognition module 112 in this example includes a query tokenizing unit 502, an entity candidate identifying unit 504, a query feature extracting unit 506, and an entity determining unit 508. The query tokenizing unit 502 is responsible for receiving a query from a user 106 and dividing the query into various query segments 510. For example, the query tokenizing unit 502 may tokenize a query to generate one or more phrases using any known tokenization approaches in natural language processing. The query segments 510 are provided to the entity candidate identifying unit 504, along with alias-entity indices retrieved from the entity indices database 110. The entity candidate identifying unit 504 may first find all aliases matched with any possible query segments 510. For each alias, the entity candidate identifying unit 504 then identifies the associated entities according to the alias-entity indices. All identified entities are considered as an entity candidate set to be further processed by the entity determining unit 508. In one example, any FSA implementation may be used to look up entities corresponding to all possible segments of the query.

Figure 6:
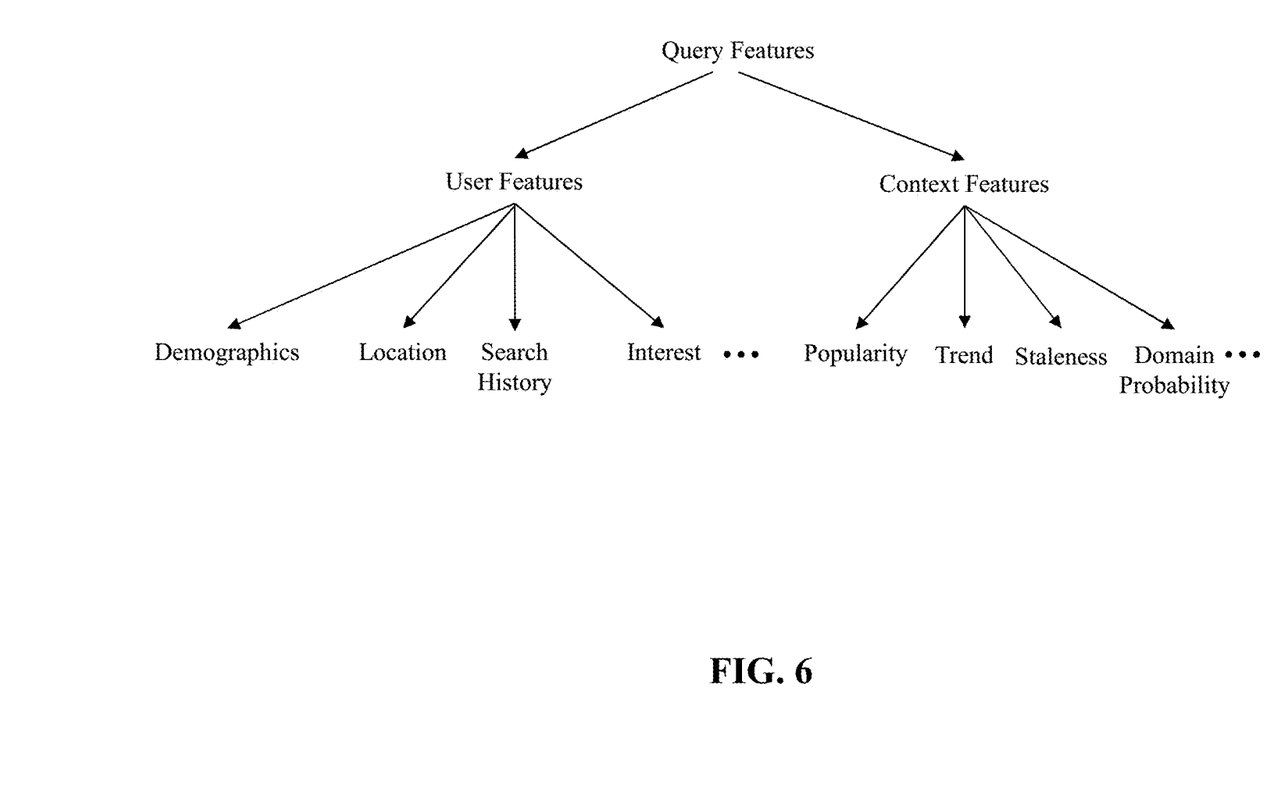
FIG. 6 depicts exemplary query features, according to an embodiment of the present teaching.

In this example, each query received from a user 106 is considered as being associated with one or more query features. Referring now to FIG. 6, the query features may include user features, which are features extracted based on information of the user, and context features, which are features extracted based on context of the query. The user features include, for example, demographics (e.g., age, gender, race, etc.), user location, user search history, user interest, to name a few. The context features include, such as query popularity, query trend, query staleness/recency, query domain probability, etc. Referring back to FIG. 5, the query feature extracting unit 506 in this example includes user feature extracting logic 512 and context feature extracting logic 514 for extracting user features and context features from user information database 516 and query context database 518, respectively. The user information database 516 stores any available user information collected by the system 100 or any third-party service providers, and the query context database 518 stores context information that is collected by the system 100 or any third-party service providers. Once a query is received from a user 106, the query feature extracting unit 506 first identifies the specify query and the user 106 and then provide the corresponding user features and context features (together as query features) to the entity determining unit 508 at substantially the same time as the entity candidate identifying unit 504 determines the entity candidate set for the same query. In addition to the entity candidate set and query features, another stream of data that is provided to the entity determining unit 508 includes entity features for each entity candidate. As mentioned before, in the entity indices database 110, each entity is associated with one or more features. Once the entity candidate set for a particular query is determined, entity features associated with each entity candidate are retrieved from the entity indices database 110 and fed into the entity determining unit 508.

The entity determining unit 508 is responsible for refining the entity candidates to provide one or more ranked entities to the search engine 102. The entity determining unit 508 in this example includes entity candidate filtering logic 520, entity candidate ranking logic 522, and ranking model training logic 524. The entity candidate filtering logic 520 is configured to filter out some of the entity candidates based on entity features and filtering rules 526 to reduce the size of the entity candidate set. It is understood that in some embodiments, the entity candidate filter logic 520 may not be applied if the size of an entity candidate set is smaller than a threshold. Various filtering rules 526 may be applied by the entity candidate filter logic 520 based on respective entity features. In one example, the filtering rules 526 include location-filtering, which removes real-world entities that are far away from where the user is. In another example, domain-filtering may be applied to exclude entities from certain domains, which are deemed as unsuitable due to the user's preferences or limitation on the user device. In still another example, staleness-filtering and popularity-filtering may be applied to remove entities that are outdated and unpopular for general audiences. It is understood that the filtering rules 526 may also include a "blacklist" to block certain entities that are restricted by laws and regulations.

The filtered entity candidates are then provided to the entity candidate ranking logic 522 for ranking based on the query features and corresponding entity features of each remaining entity candidate using a ranking model 528. The ranking model 528 may be any suitable machine learning model that ranks the entity candidates based on, for example, relevance between the query features and corresponding entity features of each entity candidate. Back to the "007" example mentioned above, assuming the user who inputs the "007" is sitting in a movie theater (location feature) at the time when the movie "Skyfall" just hits the big screen (staleness/recency feature). The relevance between the query "007" and the entity candidate "Skyfall" would likely be higher than other entity candidates, e.g., "James Bond" or "Pierce Brosnan." Thus, "Skyfall" will be ranked on top of the list for this particular query in view of the context. That is, one of the goals of training the ranking model 528 is to make the ranking context aware. For example, query "Winter Olympics" should give the top entity "Sochi Olympics" until the next Winter Olympics in Korea is about to happen. In another example, the query "latest hobbits movie" should give "Desolation of Smaug" until "There and Back Again" is released. Additionally or optionally, if the number of the entities after the entity candidate ranking logic 522 is still relatively large, a threshold number N of entities to be provided to the search engine 102 may be set such that only the top N entities above the threshold are returned.

The ranking model 528 used by the entity candidate ranking logic 522 may be trained by the ranking model training logic 524 based on editorial labeling and/or user feedback. For user feedback, user's explicit and/or implicit responses to the search results (e.g., click-through rate, dwell time, click and skip rate, etc.) provided based on each determined entity may be used as quality metrics of the ranking model 528 in the training. The training data may also be manually labeled, such as by editorial labeling.

The entity determining unit 508 in some embodiments performs a two-stage ranking including a first stage filtering/ranking based on filtering rules 526 and a second stage ranking/filtering based on the ranking model 528. The rule-based filtering/ranking at the first stage is less computationally intensive compared with the model-based ranking at the second stage. The rule-based filtering/ranking at the first stage can reduce the number of entity candidates to be processed by the model-based ranking at the second stage, thereby increasing the efficiency of the ranking. Therefore, this arrangement allows the system 100 to scale to a large entity base and make efficient use of user context by a single ranking model. It is also understood that in case for ambiguous queries without sufficient user and/or context information, the ranking may become a popularity ranking of the entity candidates based on search history of general population. For example, for query "brad pitt," the ranked entities may be "Brad Pitt (Actor)" followed by "Brad Pitt (Boxer)" because the actor is more often searched than the boxer if there is no other user information or context information associated with the specific query that is available.

Figure 7:
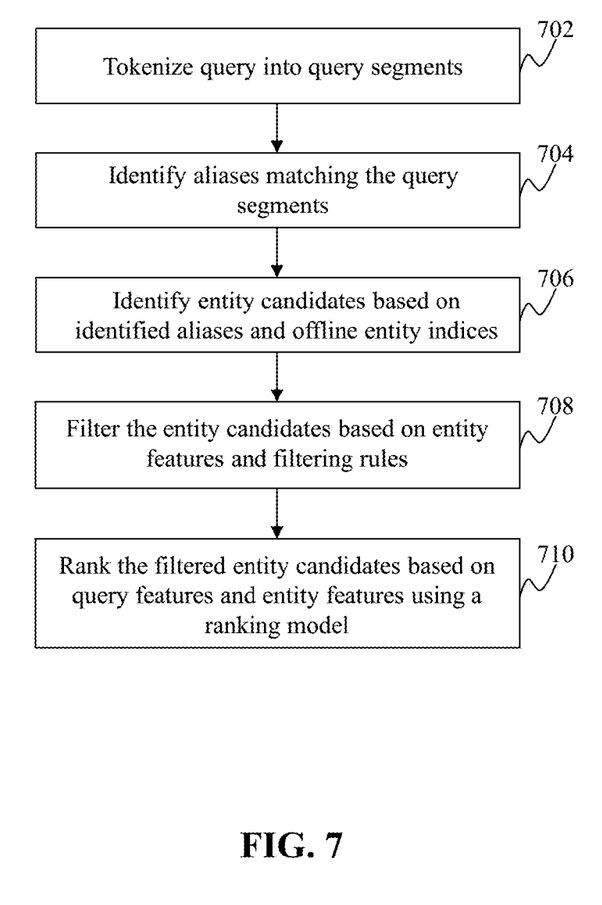
FIG. 7 is a flowchart of an exemplary process for the entity recognition module shown in FIG. 5, according to an embodiment of the present teaching.

FIG. 7 is a flowchart of an exemplary process for the entity recognition module 112 shown in FIG. 5, according to an embodiment of the present teaching. Beginning at 702, at runtime, a query is tokenized into query segments. Each of the query segments is checked against all aliases in the offline entity indices to identify all matched aliases at 704. At 706, entity candidates are further identified based on identified aliases and the offline entity indices. At 708, the entity candidates are filtered based on entity features and filtering rules to reduce the number of the entity candidate set. The remaining entity candidates are then ranked at 710 based on query features and respective entity features using a ranking model. The ranking model may be learnt from user feedback with guided exploration strategies or from editorial labels.

Figure 8:
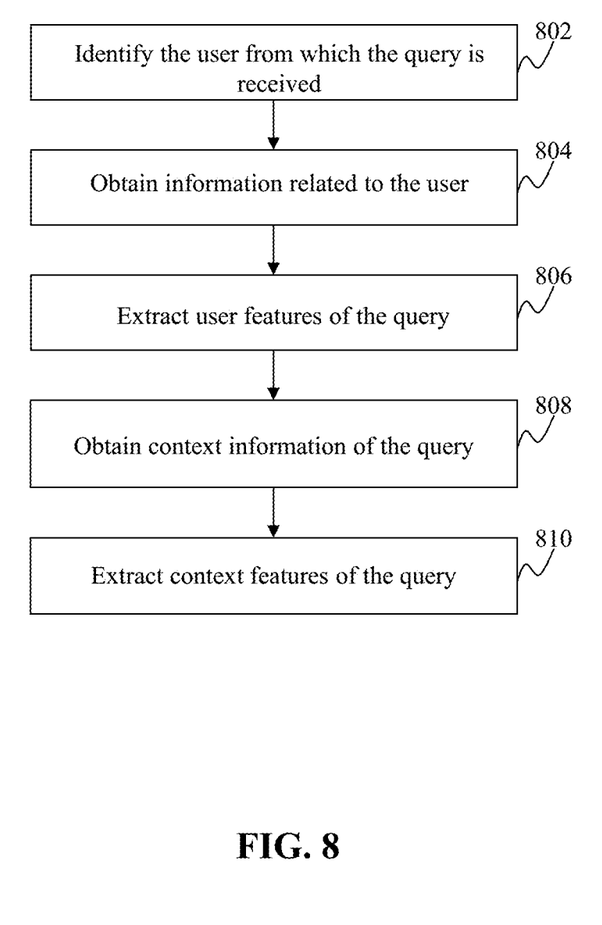
FIG. 8 is a flowchart of another exemplary process for the entity recognition module shown in FIG. 5, according to an embodiment of the present teaching.

FIG. 8 is a flowchart of another exemplary process for the entity recognition module 112 shown in FIG. 5, according to an embodiment of the present teaching. This process illustrates an example of obtaining query features from user information and context information. Beginning at 802, the user from which a query is received is identified. Information related to the identified user is obtained at 804. Such information may include for example user profiles, user online behaviors, user online content consumption patterns, each of which can be either offline collected and mined or obtained at runtime once the user is identified. At 806, user features are extracted based on the user information at 806. For example, user location may be determined at runtime once the user is identified by GPS information obtained through the user device. In another example, a user's declared interests may be extracted from the user's social media data. In still another example, a user's implicit interests may be inferred based on the user's online behaviors and/or the user's online content consumption patterns. At 808, context information of the query is obtained. Context features are then extracted from the context information at 810. For instance, query trend and query popularity may be mined from query logs.

Figure 9:
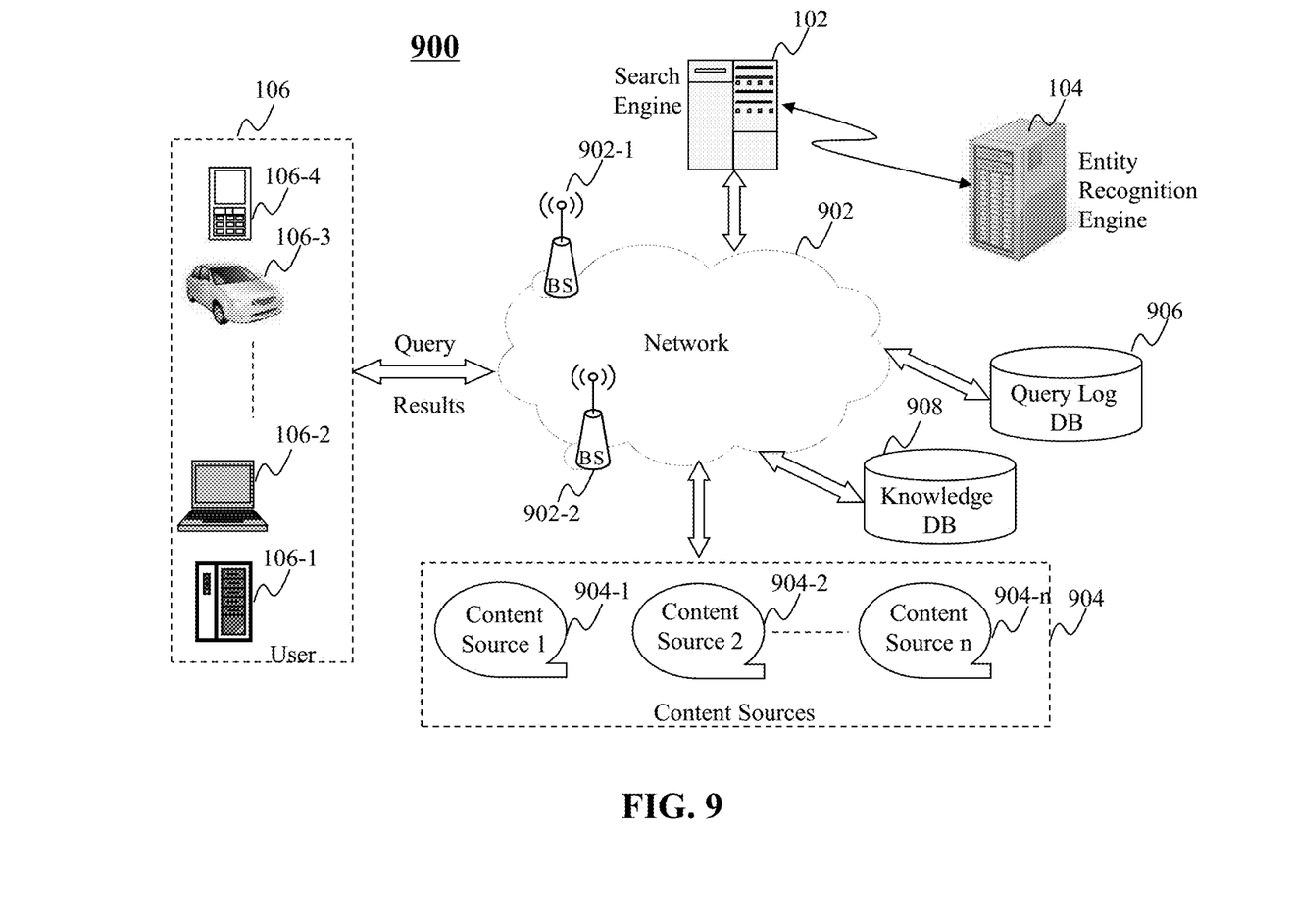
FIG. 9 depicts an exemplary embodiment of a networked environment in which entity recognition in a query is applied, according to an embodiment of the present teaching.

FIG. 9 depicts an exemplary embodiment of a networked environment in which entity recognition in a query is applied, according to an embodiment of the present teaching. In FIG. 9, the exemplary networked environment 900 includes the search engine 102, the entity recognition engine 104, one or more users 106, a network 902, content sources 904, query log database 906, and knowledge database 908. The network 902 may be a single network or a combination of different networks. For example, the network 902 may be a local area network (LAN), a wide area network (WAN), a public network, a private network, a proprietary network, a Public Telephone Switched Network (PSTN), the Internet, a wireless network, a virtual network, or any combination thereof. The network 902 may also include various network access points, e.g., wired or wireless access points such as base stations or Internet exchange points 902-1, ..., 902-2, through which a data source may connect to the network in order to transmit information via the network.

Users 106 may be of different types such as users connected to the network 902 via desktop computers 106-1, laptop computers 106-2, a built-in device in a motor vehicle 106-3, or a mobile device 106-4. A user 106 may send a query to the search engine 102 via the network 902 and receive query results from the search engine 102. At least some of the search results are obtained based on entities recognized and ranked by the entity recognition engine 104 based on the user query. In this embodiment, the entity recognition engine 104 serves as a backend system for providing entity recognition and ranking function to the search engine 102. In addition, search engine 102 and the entity recognition engine 104 may access information, via the network 902, stored in the query log database 906 and knowledge database 908 for extracting entity features and query features and building entity indices. The information in the query log database 906 and knowledge database 908 may be generated by one or more different applications (not shown), which may be running on the search engine 102 and/or the entity recognition engine 104, at the backend of the search engine 102 and/or the entity recognition engine 104, or as a completely standalone system capable of connecting to the network 902, accessing information from different sources, analyzing the information, generating structured information, and storing such generated information in the query log database 906 and knowledge database 908.

The content sources 904 include multiple content sources 904-1, 904-2, ..., 904-n, such as vertical content sources (domains). A content source may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search engine 102 and the entity recognition engine 104 may access information from any of the content sources 904-1, 904-2, ..., 904-n. For example, the search engine 102 may fetch content, e.g., websites, through its web crawler to build a search index.

Figure 10:
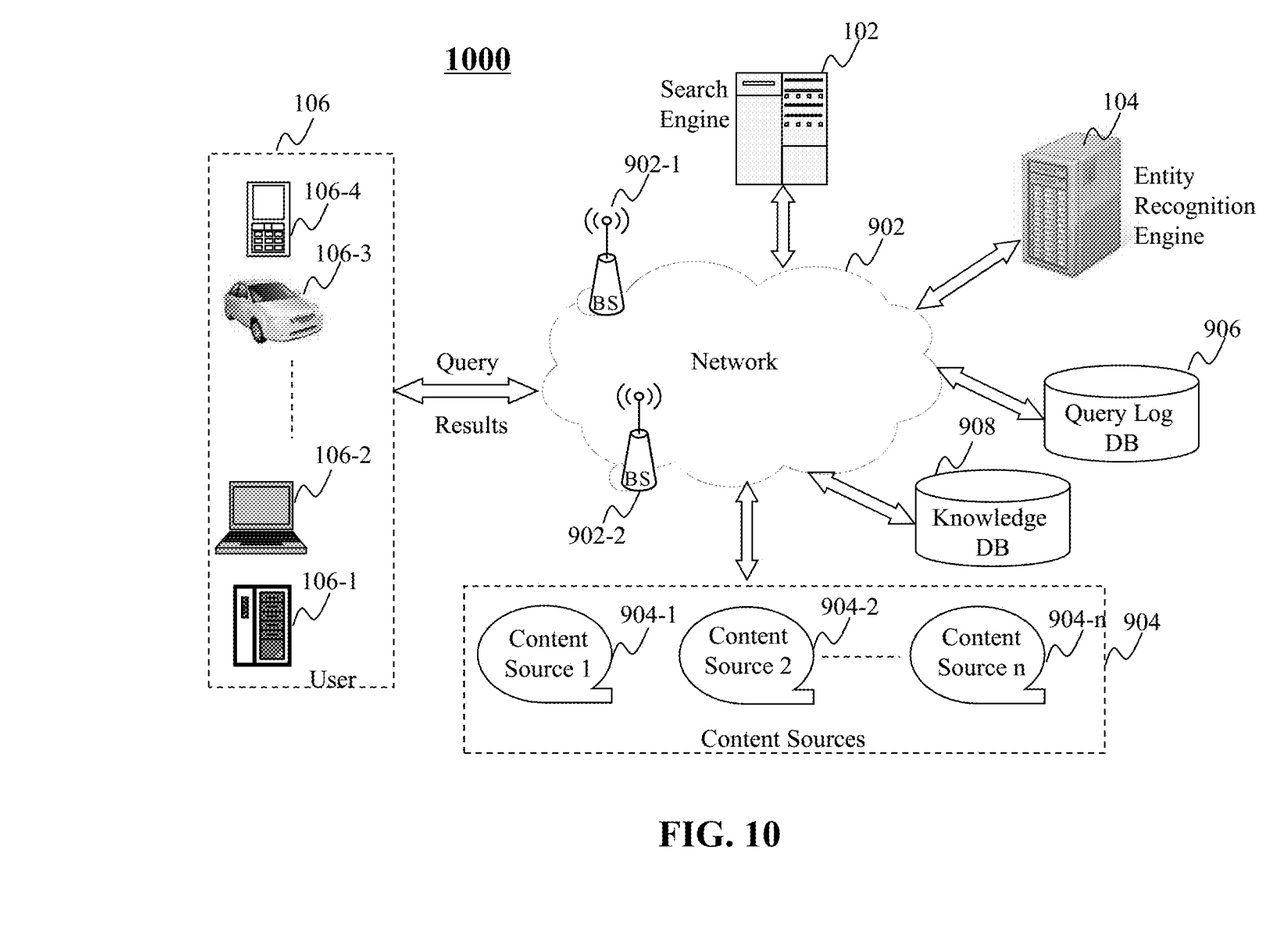
FIG. 10 depicts an exemplary embodiment of another networked environment in which entity recognition in a query is applied, according to an embodiment of the present teaching.

FIG. 10 is a high level depiction of another exemplary networked environment 1000 in which entity recognition in a query is applied, according to an embodiment of the present teaching. The networked environment 1000 in this embodiment is similar to the networked environment 900 in FIG. 9, except that the entity recognition engine 104 in this embodiment directly connects to the network 902. For example, an independent service provider with the entity recognition engine 104 may serve multiple search engines via the network 902.

Figure 11:
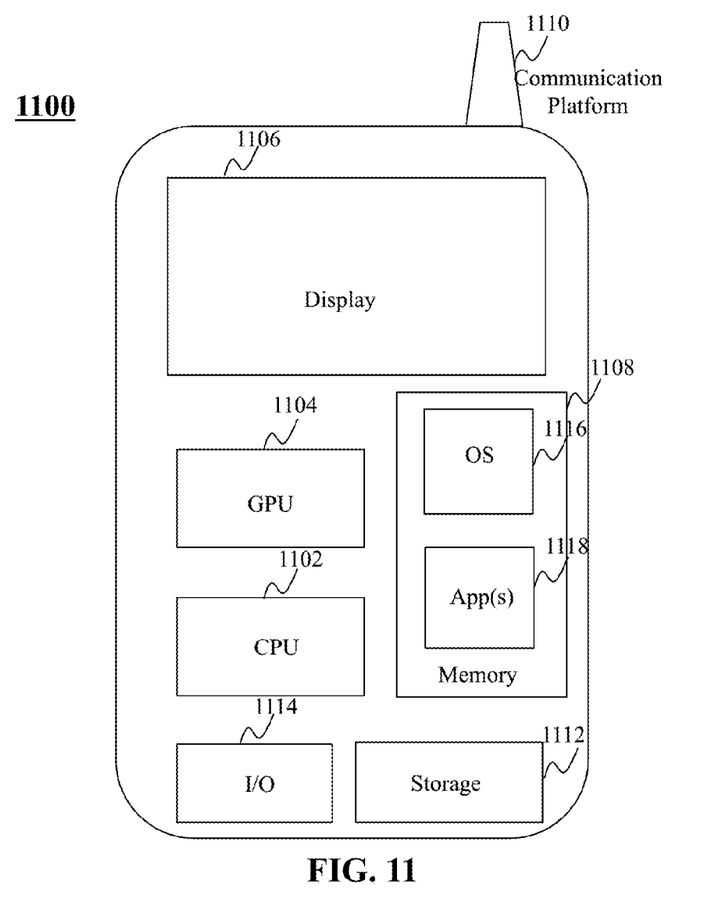
FIG. 11 depicts a general mobile device architecture, according to an embodiment of the present teaching.

FIG. 11 depicts a general mobile device architecture on which the present teaching can be implemented. In this example, the user device is a mobile device 1100, including but is not limited to, a smart phone, a tablet, a music player, a handled gaming console, a GPS receiver. The mobile device 1100 in this example includes one or more central processing units (CPUs) 1102, one or more graphic processing units (GPUs) 1104, a display 1106, a memory 1108, a communication platform 1110, such as a wireless communication module, storage 1112, and one or more input/output (I/O) devices 1114. Any other suitable component, such as but not limited to a system bus or a controller (not shown), may also be included in the mobile device 1100. As shown in FIG. 11, a mobile operating system 1116, e.g., iOS, Android, Windows Phone, etc., and one or more applications 1118 may be loaded into the memory 1108 from the storage 1112 in order to be executed by the CPU 1102. The applications 1118 may include a web browser or any other suitable mobile search apps. Execution of the applications 1118 may cause the mobile device 1100 to perform some processing as described before. For example, the display of search results is made by the GPU 1104 in conjunction with the display 1106. User inputs of search queries are received via the I/O devices 1114 and sent to the search engine 102 via the communication platform 1110.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 12:
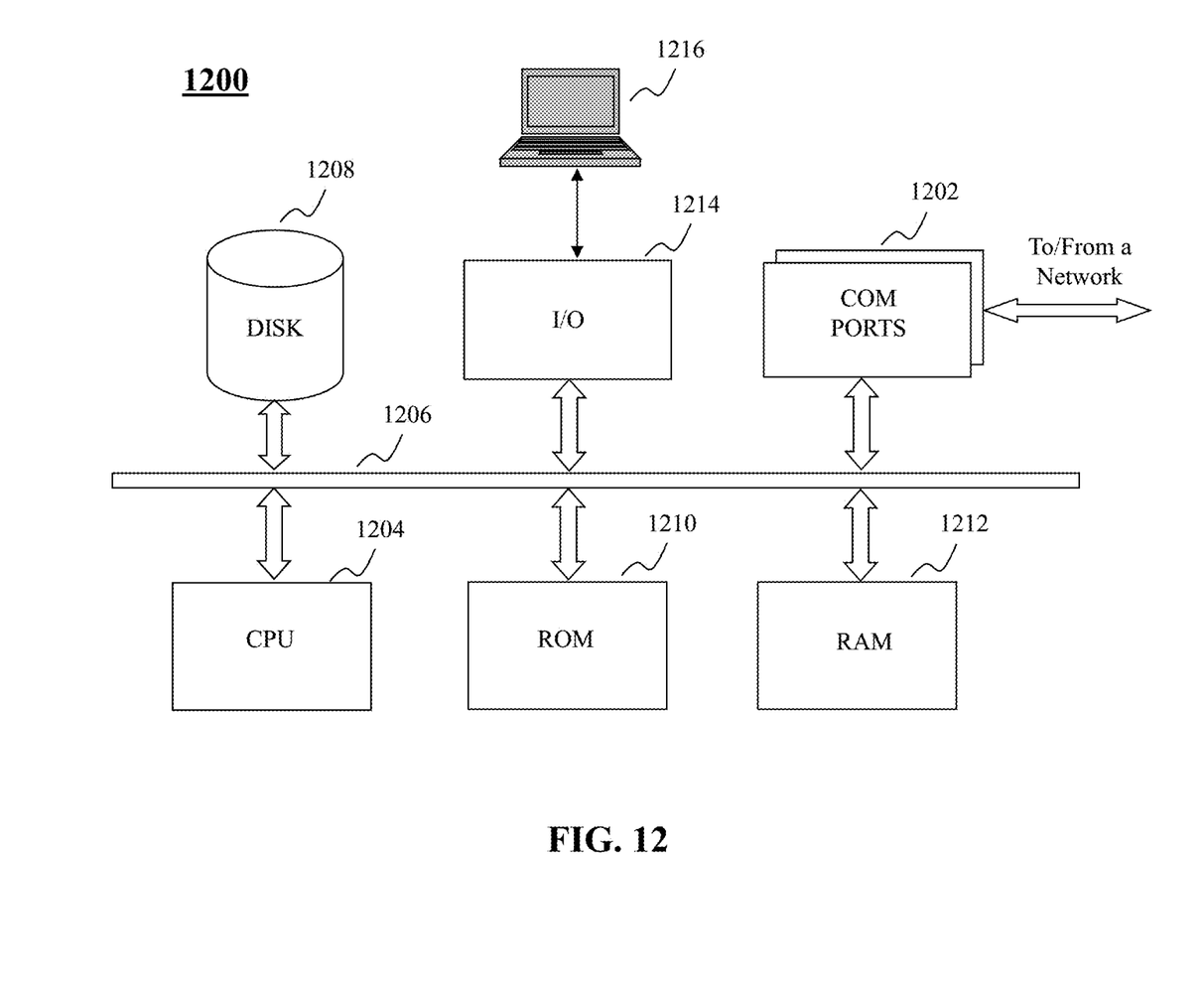
FIG. 12 depicts a general computer architecture on which the present teaching can be implemented.

FIG. 12 depicts a general computer architecture on which the present teaching can be implemented and has a functional block diagram illustration of a computer hardware platform that includes user interface elements. The computer may be a general-purpose computer or a special purpose computer. This computer 1200 can be used to implement any components of the entity recognition architecture as described herein. Different components of the system, e.g., as depicted in FIG. 1, can all be implemented on one or more computers such as computer 1200, via its hardware, software program, firmware, or a combination thereof. Although only one such computer is shown, for convenience, the computer functions relating to query results presentation may be implemented in a distributed fashion on a number of similar platforms, to distribute the processing load.

The computer 1200, for example, includes COM ports 1202 connected to and from a network connected thereto to facilitate data communications. The computer 1200 also includes a central processing unit (CPU) 1204, in the form of one or more processors, for executing program instructions. The exemplary computer platform includes an internal communication bus 1206, program storage and data storage of different forms, e.g., disk 1208, read only memory (ROM) 1210, or random access memory (RAM) 1212, for various data files to be processed and/or communicated by the computer, as well as possibly program instructions to be executed by the CPU. The computer 1200 also includes an I/O component 1214, supporting input/output flows between the computer and other components therein such as user interface elements 1216. The computer 1200 may also receive programming and data via network communications.

Hence, aspects of the method of entity recognition in a query, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the modules and units of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for entity recognition in a query, the method comprising the steps of:
   obtaining, by the at least one processor, an index that associates an alias with one or more entities, wherein each of the one or more entities is associated with one or more first features;
   receiving, by the at least one processor, a query from a user, wherein the query is associated with one or more second features;
   identifying, by the at least one processor, the alias in the query;
   determining, by the at least one processor, whether the alias is associated with a single entity or with two or more entities according to the index;
   responsive to a determination that the alias is associated with the single entity, selecting, by the at least one processor, the single entity;
   responsive to a determination that the alias is associated with the two or more entities, selecting, by the at least one processor, at least one of the two or more entities based, at least in part, on the one or more first features associated with each of the two or more entities and the one or more second features associated with the query; and
   providing, by the at least one processor, a search result to the user based on the selected single entity or the selected at least one of the two or more entities.

2. The method of claim 1, wherein the index is obtained from a plurality of indices, each of which is generated offline by mapping a respective alias with entities across a plurality of domains.

3. The method of claim 1, wherein the one or more second features associated with the query include at least one of:
   features extracted based on information of the user; and
   features extracted based on context of the query.

4. The method of claim 1, wherein the selecting the at least one of the two or more entities comprises:
- filtering the two or more entities based on their respective first features; and
- ranking the filtered two or more entities based on relevance between their respective one or more first features and the one or more second features associated with the query.

5. The method of claim 4, wherein the ranking the filtered two or more entities is performed based on a model that is trained based on at least one of user feedback and editorial labeling.

6. The method of claim 1, wherein when the alias is associated with two or more entities according to the index, the at least one of the two or more entities is selected based, at least in part, on popularity of each of the two or more entities in a search history.

7. A system having at least one processor, storage, and a communication platform for entity recognition in a query, the system comprising:
- an indexing module, implemented on the at least one processor and configured to obtain an index that associates an alias with one or more entities, wherein each of the one or more entities is associated with one or more first features;
- a tokenizing unit, implemented on the at least one processor and configured to receive a query from a user, wherein the query is associated with one or more second features;
- an identifying unit, implemented on the at least one processor and configured to identify the alias in the query;
- a determining unit, implemented on the at least one processor and configured to:
  - determine whether the alias is associated with a single entity or with two or more entities according to the index;
  - responsive to a determination that the alias is associated with the single entity, select the single entity; and
  - responsive to a determination that the alias is associated with the two or more entities, select at least one of the two or more entities based, at least in part, on the one or more first features associated with each of the two or more entities and the one or more second features associated with the query; and
- a search engine, implemented on the at least one processor and configured to provide a search result to the user based on the selected single entity or the selected at least one of the two or more entities.

8. The system of claim 7, wherein the index is obtained from a plurality of indices, each of which is generated offline by mapping a respective alias with entities across a plurality of domains.

9. The system of claim 7, wherein the one or more second features associated with the query include at least one of:
- features extracted based on information of the user; and
- features extracted based on context of the query.

10. The system of claim 7, wherein the determining unit comprises:
- filtering logic configured to filter the two or more entities based on their respective first features; and
- ranking logic configured to rank the filtered two or more entities based on relevance between their respective one or more first features and the one or more second features associated with the query.

11. The system of claim 10, wherein ranking the filtered two or more entities is performed based on a model that is trained based on at least one of user feedback and editorial labeling.

12. The system of claim 7, wherein when the alias is associated with two or more entities according to the index, the at least one of the two or more entities is selected based, at least in part, on popularity of each of the two or more entities in a search history.

13. A non-transitory machine-readable medium having information recorded thereon for entity recognition in a query, wherein the information, when read by the machine, causes the machine to perform the following:
- obtaining, by at least one processor, an index that associates an alias with one or more entities, wherein each of the one or more entities is associated with one or more first features;
- receiving, by the at least one processor, a query from a user, wherein the query is associated with one or more second features;
- identifying, by the at least one processor, the alias in the query;
- determining, by the at least one processor, whether the alias is associated with a single entity or with two or more entities according to the index;
- responsive to a determination that the alias is associated with the single entity, selecting, by the at least one processor, the single entity;
- responsive to a determination that the alias is associated with the two or more entities, selecting, by the at least one processor, at least one of the two or more entities based, at least in part, on the one or more first features associated with each of the two or more entities and the one or more second features associated with the query; and
- providing, by the at least one processor, a search result to the user based on the selected single entity or the selected at least one of the two or more entities.

14. The medium of claim 13, wherein the index is obtained from a plurality of indices, each of which is generated offline by mapping a respective alias with entities across a plurality of domains.

15. The medium of claim 13, wherein the one or more second features associated with the query include at least one of:
- features extracted based on information of the user; and
- features extracted based on context of the query.

16. The medium of claim 13, wherein the selecting the at least one of the two or more entities comprises:
- filtering the two or more entities based on their respective first features; and
- ranking the filtered two or more entities based on relevance between their respective one or more first features and the one or more second features associated with the query.

17. The medium of claim 13, wherein when the alias is associated with two or more entities according to the index, the at least one of the two or more entities is selected based, at least in part, on popularity of each of the two or more entities in a search history.

* * * * *